United States Patent
Kim et al.

(10) Patent No.: US 11,927,931 B2
(45) Date of Patent: Mar. 12, 2024

(54) ARTIFICIAL INTELLIGENCE-BASED AIR CONDITIONER

(71) Applicant: LG ELECTRONICS INC., Seoul (KR)

(72) Inventors: Sungjin Kim, Seoul (KR); Jingyeong Kim, Seoul (KR); Taehyun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 95 days.

(21) Appl. No.: 17/623,084

(22) PCT Filed: Jun. 27, 2019

(86) PCT No.: PCT/KR2019/007808
§ 371 (c)(1),
(2) Date: Dec. 27, 2021

(87) PCT Pub. No.: WO2020/262733
PCT Pub. Date: Dec. 30, 2020

(65) Prior Publication Data
US 2022/0260272 A1    Aug. 18, 2022

(51) Int. Cl.
*G05B 19/042*      (2006.01)
*F24F 11/46*       (2018.01)
(Continued)

(52) U.S. Cl.
CPC ............ *G05B 19/042* (2013.01); *F24F 11/46* (2018.01); *F24F 11/56* (2018.01); *F24F 11/65* (2018.01);
(Continued)

(58) Field of Classification Search
CPC .............. G06V 40/16; F24F 2120/10; G05B 2219/2614
See application file for complete search history.

(56) References Cited

U.S. PATENT DOCUMENTS 10,847,009 B1 * 11/2020 Sulucz .................. G06T 7/136
2014/0020860 A1    1/2014 Matsumoto
(Continued)

FOREIGN PATENT DOCUMENTS

JP    2010-175102 A    8/2010
JP    2014-219128 A    11/2014
(Continued)

OTHER PUBLICATIONS

International Search Report (PCT/ISA/210) issued in PCT/KR2019/007808, dated Mar. 26, 2020.

*Primary Examiner* — Nathan L Laughlin
(74) *Attorney, Agent, or Firm* — Birch, Stewart, Kolasch & Birch, LLP (57) ABSTRACT

An artificial intelligence (AI)-based air conditioner can include a communication unit and a processor. The communication can receive an image including member data from an image acquisition device, where the member data are associated with one or more different members of a member group and are used to distinguish the members from each other. The processor can recognize the member data from the received image, acquire operation data including operation conditions of the air conditioner, which are desired by the members, based on the recognized member data, store member information including the member data and the operation data in a database, analyze the operation conditions of the air conditioner, which are desired by the members, with respect to each member based on the member information corresponding to the member group stored in the database, and autonomously driving the air conditioner for the different members based on the analyzed operation conditions.

13 Claims, 8 Drawing Sheets

| CLASSIFICATION | TEMPERATURE | WIND SPEED | OTHERS |
|---|---|---|---|
| MEMBER 1 | 23°C | 2 m/s | User of remote controller (Set temperature/wind speed using input value) |
| MEMBER 2 | 27°C | 3 m/s | Set temperature/wind speed using preset operation data |
| MEMBER 3 | 28°C | 4 m/s | Set temperature/wind speed using preset operation data |

<Set reward according to operation condition>

(51) Int. Cl.
    *F24F 11/56*     (2018.01)
    *F24F 11/65*     (2018.01)
    *G06V 10/774*     (2022.01)
    *G06V 40/10*     (2022.01)
    *G06V 40/16*     (2022.01)
    *F24F 120/10*     (2018.01)
    *G10L 15/22*     (2006.01)

(52) U.S. Cl.
    CPC .......... *G06V 10/774* (2022.01); *G06V 40/103* (2022.01); *G06V 40/16* (2022.01); *F24F 2120/10* (2018.01); *G05B 2219/2614* (2013.01); *G10L 15/22* (2013.01)

(56) References Cited

U.S. PATENT DOCUMENTS

| | | | | |
|---|---|---|---|---|
| 2016/0377309 A1* | 12/2016 | Abiprojo | ................ | F24F 11/47 700/276 |
| 2020/0110532 A1* | 4/2020 | Mani | .................. | H04N 23/611 |
| 2020/0186378 A1* | 6/2020 | Six | ..................... | H04L 41/22 |
| 2020/0333033 A1* | 10/2020 | Kitagawa | ............. | G05B 13/042 |
| 2021/0164676 A1* | 6/2021 | Huang | .................... | F24F 11/56 |

FOREIGN PATENT DOCUMENTS

| KR | 10-2001-0011492 A | 2/2001 |
|---|---|---|
| KR | 10-2003-0008028 A | 1/2003 |
| KR | 10-2009-0115586 A | 11/2009 |
| KR | 10-2014-0011248 A | 1/2014 |
| KR | 10-2018-0074565 A | 7/2018 |
| KR | 10-2019-0035007 A | 4/2019 |

\* cited by examiner

ARTIFICIAL INTELLIGENCE-BASED AIR CONDITIONER

CROSS REFERENCE TO RELATED APPLICATIONS

This application is the National Stage filing under 35 U.S.C. 371 of International Application No. PCT/KR2019/007808, filed on Jun. 27, 2019, the entire contents of which are hereby expressly incorporated by reference herein in their entirety.

TECHNICAL FIELD

The present invention relates to an AI-based air-conditioner.

BACKGROUND ART

Artificial intelligence is a field of computer engineering and information technology involving studying how computers can think, learn and self-develop in ways similar to human intelligence, and means that computers can emulate intelligent actions of humans.

In addition, artificial intelligence does not exist by itself but is directly or indirectly associated with the other fields of computer science. In particular, many attempts have been made to introduce elements of artificial intelligence into various fields of information technology.

Recently, technologies for applying artificial intelligence to home appliances so as to operate for various purposes are being tried. Home appliances are automatically controlled in the manner that is programmed for the purpose without the intervention of the human. For example, in the case of an air-conditioner to which the artificial intelligence is applied, the air-conditioner may be automatically adjusted in wind direction and speed and automatically controlled in temperature to give convenience to the user and reduce a power loss.

In this regard, Korean Patent Publication No. 2001-0011492 (METHOD FOR CONTROLLING OPERATION OF AIR-CONDITIONER) discloses a method, in which a temperature of an indoor room, in which an air-conditioner is installed, is measured to multiply compare a difference in temperature between the indoor room and the outdoor room so as to maintain health.

However, according to the prior art, since only the power loss is collectively controlled by the indoor and outdoor temperature without distinction of members who actually use the air-conditioner, the members in the indoor space are not considered. In this case, there is a problem in that the power loss is still expected by considering only the temperature regardless of the number and location of the internal members.

DISCLOSURE OF THE INVENTION

Technical Problem

An object of the present invention is to provide an artificial intelligence-based air-conditioner that is capable of automatically identifying members who use the air-conditioner and being adjusted to suit characteristics of the member in terms of convenience.

An object of the present invention is to provide an artificial intelligence-based air-conditioner that is capable of automatically identifying members who use the air-conditioner and capable of reducing a power loss in terms of economy.

Technical Solution

An artificial intelligence (AI)-based air-conditioner according to an embodiment of the present invention includes: a communication unit configured to receive an image comprising member data, through which members are distinguished from each other, from an image acquisition device corresponding to a group comprising at least one member; and a processor configured to: recognize the member data from the received image; acquire operation data comprising operation conditions of the air-conditioner, which are desired by the members, based on the recognized member data; store member information comprising the member data and the operation data in a database; and acquire and analyze the operation conditions of the air-conditioner, which are desired by the members, with respect to each member from the plurality of pieces of member information corresponding to the group stored in the database, wherein the AI-based air-conditioner is autonomously driven under the control of the processor.

In an embodiment, the air-conditioner may further include a memory configured to store a member data recognition model that is trained using a machine learning or deep learning algorithm and is configured to recognize the member data from the image.

In an embodiment, the processor may be configured to: input the image received from the image acquisition device as input data of the member data recognition model; acquire the member data recognized from the member data recognition model; and extract who are the members based on the image and the member data.

In an embodiment, the member data may further include information on at least one of a face shape, a body shape, or voice, through which the members are distinguished from each other.

In an embodiment, the face shape or the body shape may be extracted from a still image or a moving image, which is collected at at least one angle according to movement of each of the members.

In an embodiment, the member data may further include biometric information, wherein the biometric information may include at least one of pulse information, body temperature information, or facial expression information of the member.

In an embodiment, the member data may further include environment information around the member, wherein the environment information may include at least one of location information of the member, time information, or room temperature information.

In an embodiment, the operation data may be obtained by analyzing an operation pattern of a user who operates a remote control of the air-conditioner.

The operation data may be labeled by giving an operation type of the air-conditioner desired by the user and a reward for each of operation values according to the operation type.

The processor may be autonomously driven according to the operation condition according to the operation data, which is preset for each member, for other members while the user uses the air-conditioner.

The operation data may include a temperature or wind speed desired by the member and is updated in real time according to the member's request.

In an embodiment, the operation data may recognize member's voices, analyze words of the voices, and update the reward if the voices correspond to the operation type.

In an embodiment, the air-conditioner may be connected to an external server configured to store power consumed by the air-conditioner, wherein the external server may be configured to calculate an amount of electricity, which is consumed for a preset period for each member or household stored in the database, as an electricity bill and transmit the calculated value to the processor in real time.

The processor may be configured to deduce predictive information on future electricity usage based on the electricity bill.

Advantageous Effects

According to the embodiment of the present invention, the air-conditioner has the advantage of reducing the power consumption by learning the members by itself and controlling the activity in the optimal state.

In addition, the air-conditioner may have the advantage of improving in convenience of the individual members because the air-conditioner operates according to the operation conditions according to the operation data set for each member.

In addition, the air-conditioner may have the convenience of automatically updating the operation conditions of each member without the user's setting operation by updating the reward through the image acquisition device or voice recognition.

DETAILED DESCRIPTION OF THE EMBODIMENTS

Hereinafter, embodiments disclosed in this specification is described with reference to the accompanying drawings, and the same or corresponding components are given with the same drawing number regardless of reference number, and their duplicated description will be omitted. Furthermore, terms, such as a "module" ad a "unit", are used for convenience of description, and they do not have different meanings or functions in themselves. Moreover, detailed descriptions related to well-known functions or configurations will be ruled out in order not to unnecessarily obscure subject matters of the present disclosure. However, this does not limit the present disclosure within specific embodiments and it should be understood that the present disclosure covers all the modifications, equivalents, and replacements within the idea and technical scope of the present disclosure.

It will be understood that although the ordinal numbers such as first and second are used herein to describe various elements, these elements should not be limited by these numbers. The terms are only used to distinguish one component from other components.

It will also be understood that when an element is referred to as being "connected to" or "engaged with" another element, it can be directly connected to the other element, or intervening elements may also be present. It will also be understood that when an element is referred to as being 'directly connected to' another element, there is no intervening elements.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

Figure 1:
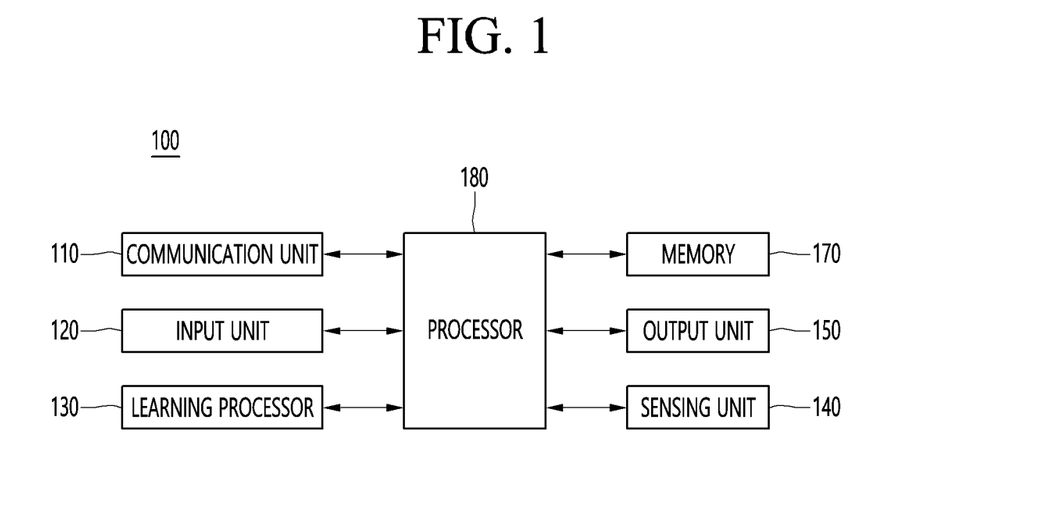
FIG. 1 is a view of an AI device according to an embodiment of the present invention.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 (e.g., FIG. 3) by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

Figure 2:
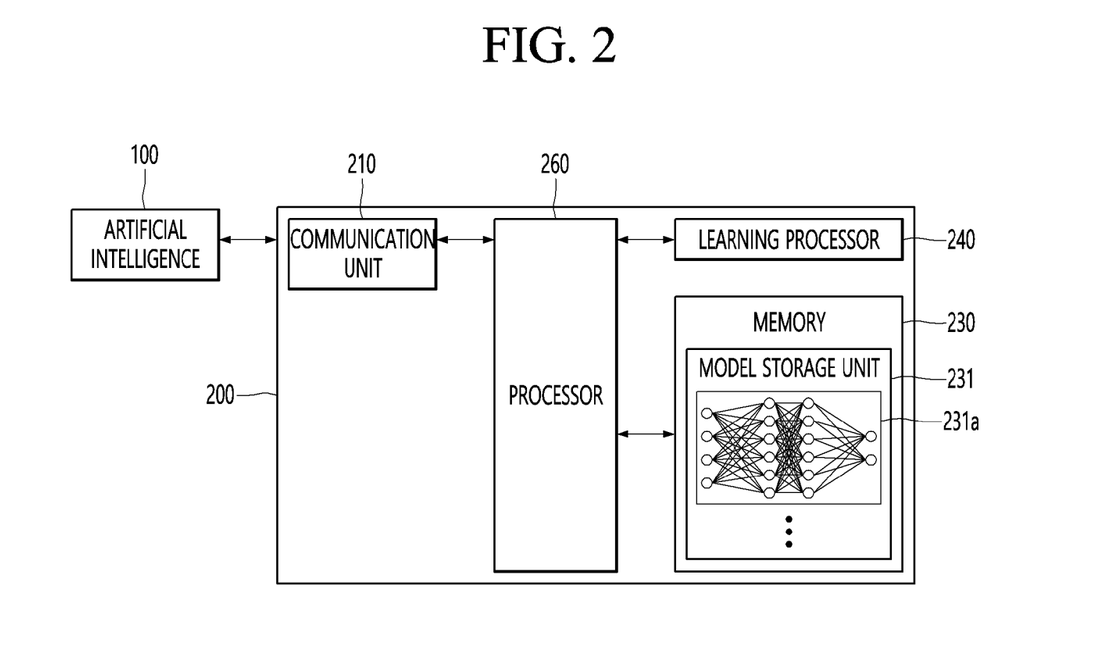
FIG. 2 is a view of an AI server according to an embodiment of the present invention.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
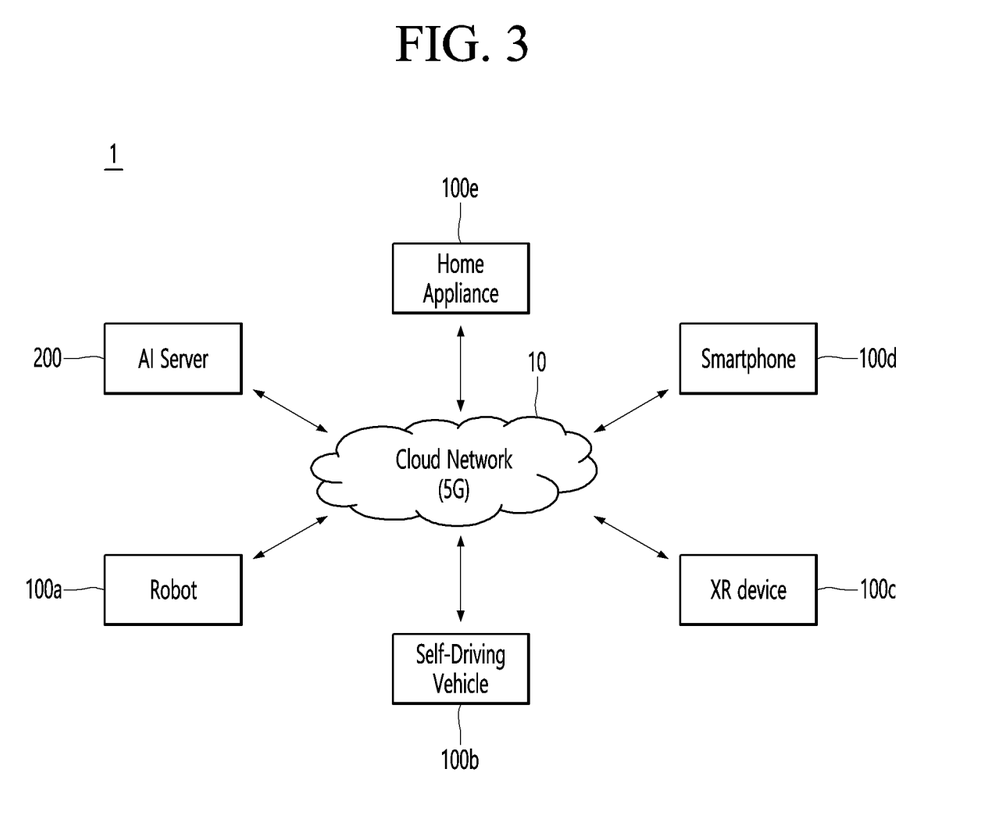
FIG. 3 is a view of an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling movement line by using the recognized surrounding information or object information. The learning model may be learned directly from the self-driving vehicle 100a or may be learned from an external device such as the AI server 200.

At this time, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
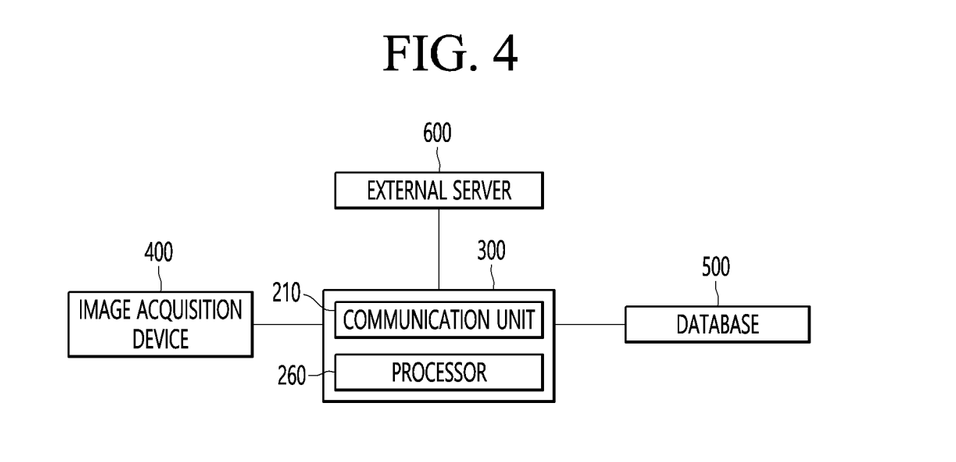
FIG. 4 is a block diagram of an AI-based air-conditioner according to an embodiment of the present invention.

FIG. 4 is a block diagram of an AI-based air-conditioner 300 according to an embodiment of the present invention.

Referring to FIG. 4, the air-conditioner 300 may include a communication unit 210, a processor 260, and a memory, in addition to known components of an air conditioner. Further, the air-conditioner 300 may be interlocked with an image acquisition device 400, a database 500, and an external server 600.

The communication unit 210 may receive an image including member data capable of distinguishing members from the image acquisition device 400 corresponding to a group including at least one member.

The communication unit 210 may transmit and receive data to and from external devices such as other AI devices 100a to 100e and the AI server 200 by using wire/wireless communication technology, like the communication unit 110 of FIG. 1. For example, the communication unit 110 may transmit and receive sensor information, a user input, a learning model, and a control signal to and from external devices.

The communication unit 210 may receive the image of each member from the image acquisition device 400 and transmit processed member data and member information to the external server 600 or the database 500.

Here, the communication unit 210 may receive and transmit the member information in the manner of global system for mobile communication (GSM), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, near field communication (NFC), or the like.

The processor 260 may recognize the member data from the received image and acquire operation data including operation conditions of the air-conditioner, which are desired by the member based on the recognized member data.

The processor 260 may store the member information, which is processed by acquiring the obtained member data and the operation data, in the database 500 and acquire and analyze the operation condition of the air-conditioner, which are desired by the members, for each member from a plurality of pieces of member information corresponding to the group stored in the database 500.

The processor 260 may determine an operation to perform the operation based on information determined or generated by using a data analysis algorithm or a machine learning algorithm. For this, the processor 260 may request, retrieve, receive, or utilize data of the learning processor or memory.

The processor 260 may acquire the intention information corresponding to the user input by using at least one of a speech to text (STT) engine for acquiring corresponding intention information by changing the user's program or converting speech input into a text string or a natural language processing (NLP) engine for acquiring intention information of a natural language.

The memory may be trained using a machine learning or deep learning algorithm and store a member data recognition model for recognizing the member data from the image.

In the memory, the processor 260 may collect history information including user feedback on the operation contents or operation of the AI device 100 and may transmit the collected history information to the external server 600 or the database 500 through the communication unit 210. The collected history information may be used to update the learning model.

Figure 5:
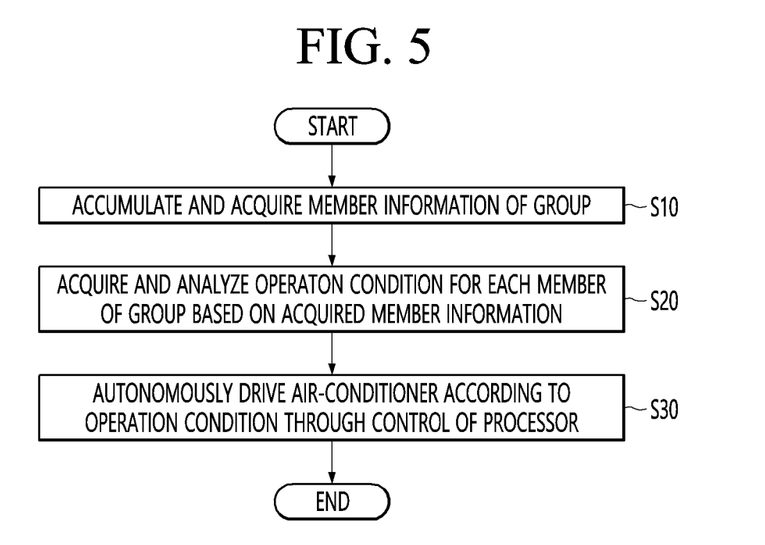
FIG. 5 is a flowchart illustrating a control operation of the air-conditioner according to an embodiment of the present invention.

FIG. 5 is a flowchart illustrating a control operation of the air-conditioner 300 according to an embodiment of the present invention.

Referring to FIG. 5, the air-conditioner 300 may include: a process (S10) of accumulatively acquiring group member information; a process (S20) of obtaining and analyzing operation conditions for each member of a group; and a process (S30) of autonomously driving the air-conditioner according to the operation conditions under the control of the processor 260.

The air-conditioner may have advantages of building data having a normalized distribution from the accumulated member information and of subdividing the operation conditions for each member.

The process (S10) of acquiring the group member information will be described below with reference to the detailed flowchart of FIG. 6.

Figure 6:
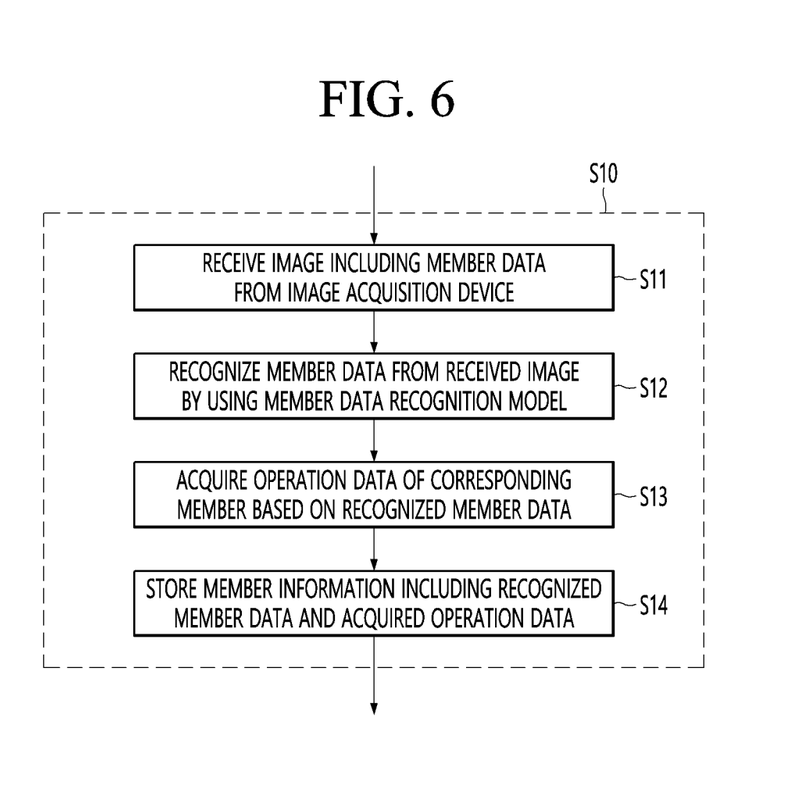
FIG. 6 is a flowchart illustrating an operation of acquiring member information in detail according to an embodiment of the present invention.

FIG. 6 is a flowchart illustrating an operation of acquiring the member information in detail according to an embodiment of the present invention.

Referring to FIG. 6, the member information may be acquired through: a process (S11) of receiving an image including the member data from the image acquisition device 400; a process (S12) of recognizing the member data from the received image; a process (S13) of acquiring operation data of the corresponding member; and a process (S14) of storing the member information including the recognized member data and the acquired operation data in the database 500.

The process (S11) of receiving the image including the member data from the image acquisition device 400 and the process (S12) of recognizing the member data from the received image will be described in addition to those of FIGS. 7 and 8.

In the case of an air-conditioner of FIGS. 5 and 6, the air-conditioner may have an advantage of improving convenience for the individual members because the air-conditioner operates according to the operation conditions according to the operation data set for each member.

Figure 7:
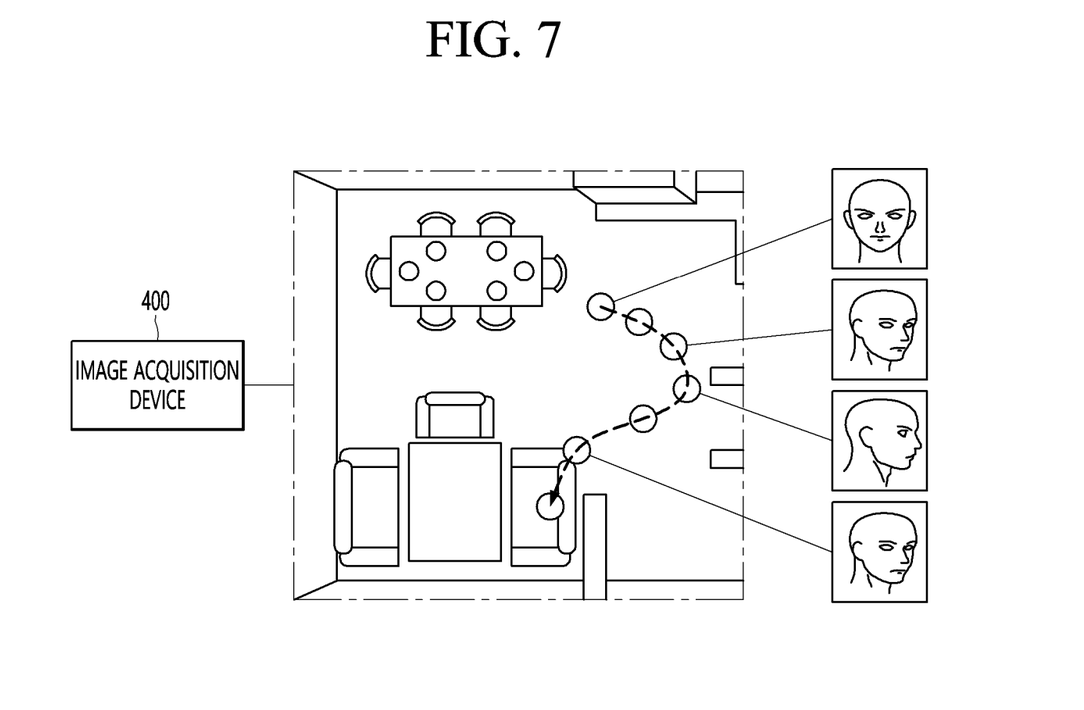
FIG. 7 is a view illustrating a process of acquiring the member information using an image acquisition device according to an embodiment of the present invention.
Figure 8:
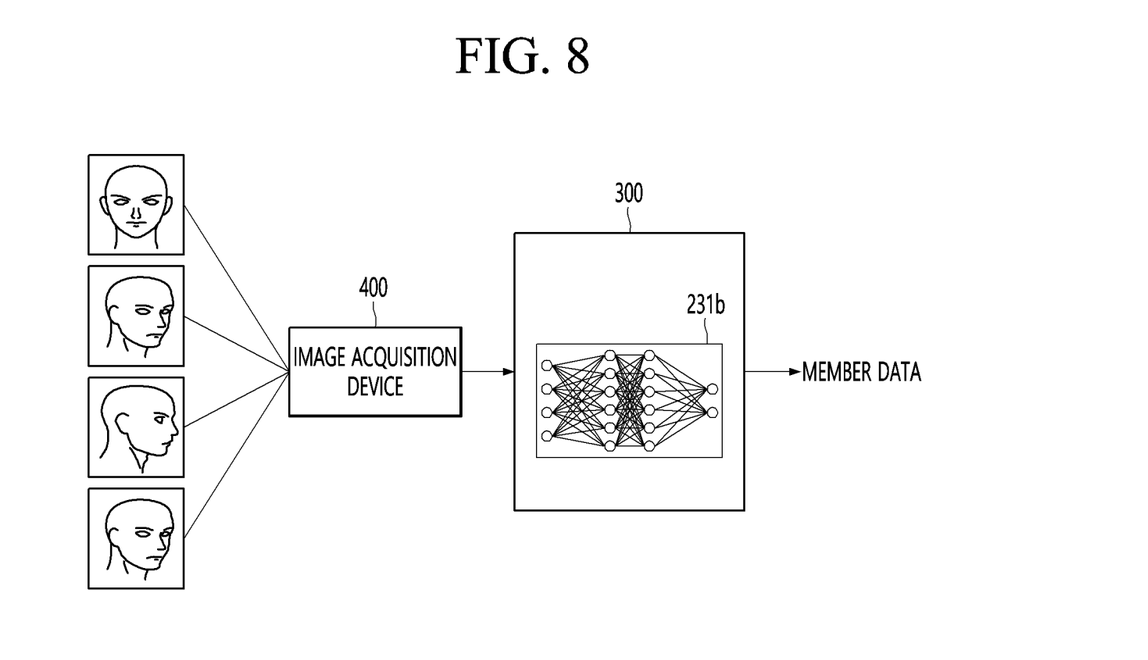
FIG. 8 is a view illustrating a process of acquiring member data through interlocking between the image acquisition device and the air-conditioner of FIG. 7 according to an embodiment of the present invention.

FIG. 7 is a view illustrating the process of acquiring the member information using the image acquisition device 400 according to an embodiment of the present invention, and FIG. 8 is a view illustrating the process of acquiring the member data through interlocking between the image acquisition device 400 and the air-conditioner 300 of FIG. 7 according to an embodiment of the present invention.

Referring to FIG. 7, the process (S11) of receiving the image including the member data from the image acquiring device 400 involves the image acquiring device 400. The image acquisition device 400 may store shapes of the same person at various angles by continuously photographing pictures along a moving line of the member so as to extract the member data.

In this case, even if the member works freely inside without being aware of the air-conditioner, since the image is acquired naturally, it is possible to avoid the hassle of limiting the member's activity or paying extra time for member registration.

Referring to FIG. 8, a process of acquiring the member data is illustrated. In the process of recognizing the member data from the received image, the processor 260 according to an embodiment of the present invention may extract the member by analyzing the member's image obtained from the image acquisition device 400.

The processor 260 may input the image received from the image acquisition device 400 as input data of the member data recognition model, acquire the member data recognized from the member data recognition model, and extract who are the members based on the image and the member data.

The member data recognition model may detect a face in a still image or a moving image acquired from the image acquisition device 400 and label the detected face with a unique value to recognize a person, and perform clustering between persons through a relation frequency matrix with respect to the recognized person.

The member data recognition model may estimate the relationship between the plurality of persons using the relationship frequency matrix and the clustered data and may repeat the above-described process to improve accuracy of the member data.

The member data may further include information on at least any one or more of a face shape, a body shape, and voice, through which the members are distinguished from each other, and the face shape or the body shape may be extracted from the collected still images or moving pictures at at least one angle according to movement of the member.

The member data may further include biometric information and environment information. The biometric information may include at least one of pulse information, body temperature information, or facial expression information of the member, and the environment information may include at least one of location information of the member, time information, or room temperature information.

In the process (S13) of acquiring the operation data of the corresponding member, data on the member's usual behavior of operating the air-conditioner may be accumulated and acquired. That is, the member information may be divided into the member data and the operation data. Here, the member data may be information for identifying who the member is, and the operation data may be data on how the member normally operates the air-conditioner. The operation data may include an operation condition, which will be described later with reference to FIG. 9.

The process (S14) of storing the member information including the recognized member data and the acquired operation data in the database 500 may be performed through the memory and the communication unit 210. The member information for which the member's operation method is determined may be stored in the memory or viewed from the memory by matching the member data with the operation data and may be transmitted and received with the external server 600 or the database 500 through the communication unit 210.

A process (S20) of acquiring and analyzing the operation conditions for each member of the group is a process of acquiring and analyzing the air-conditioner setting method contained in the operation data. The operation conditions may be obtained by the processor 260 through learning about a member's usage method, and the operation data may be configured by deducing items of which setting are usually changed by the user, and then, the operation conditions may be extracted according to each item.

Referring to Table 1 below, the operation data and operation conditions according to the member data may be extracted, and each of reward values may be deduced. The operation data may refer to data about categories such as the temperature, the wind speed, and the wind direction, which are mainly set by the members, the operation conditions may refer to the corresponding values, and the reward may be defined as values corresponding to each category of the operation conditions. That is, the reward defines specific values such as 20° C. or 1 m/s.

TABLE 1

| Member data | Operation data | Operation conditions |
| --- | --- | --- |
| Member A | Temperature, Wind speed, Wind direction | 20° C., 1 m/s, rotation at angle of 2° |
| Member B | Temperature, Wind speed | 23° C., 2 m/s |
| Member C | Wind direction, Sensory temperature | Rotation at angle of 2°, 27° C. |

Since the member information is stored and managed in the external server 600 or the database 500 as described above, there is an advantage in that the processor 260 is capable of systematically managing and updating the member information.

Figure 9:
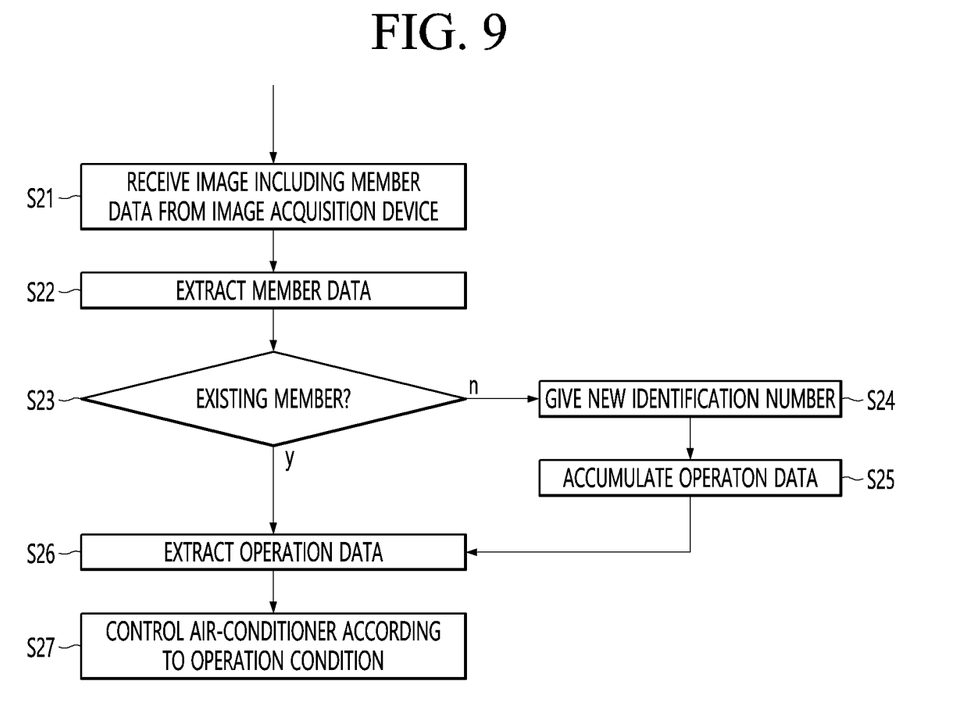
FIG. 9 is a flowchart illustrating a process of extracting operation conditions of members according to an embodiment of the present invention.

FIG. 9 is a flowchart illustrating the process of extracting the operation conditions of the members according to an embodiment of the present invention.

Referring to FIG. 9, after a process (S21) of receiving an image including member data from the image acquisition device 400 as described above, a process (S22) of extracting the member data, a process (S23) of determining whether the member is the existing member, a process (S26) of extracting operation data if the member is the existing member may be performed.

However, if the component is not the existing member, a process (S24) of giving a new identification number to the member and a process (S25) of accumulating the operation data so as to extract the operation data may be additionally performed.

After the process (S26) of extracting the operation data, the operation conditions are extracted as described above to give rewards and control (S27) the air-conditioner according to the operation conditions.

Figure 10:
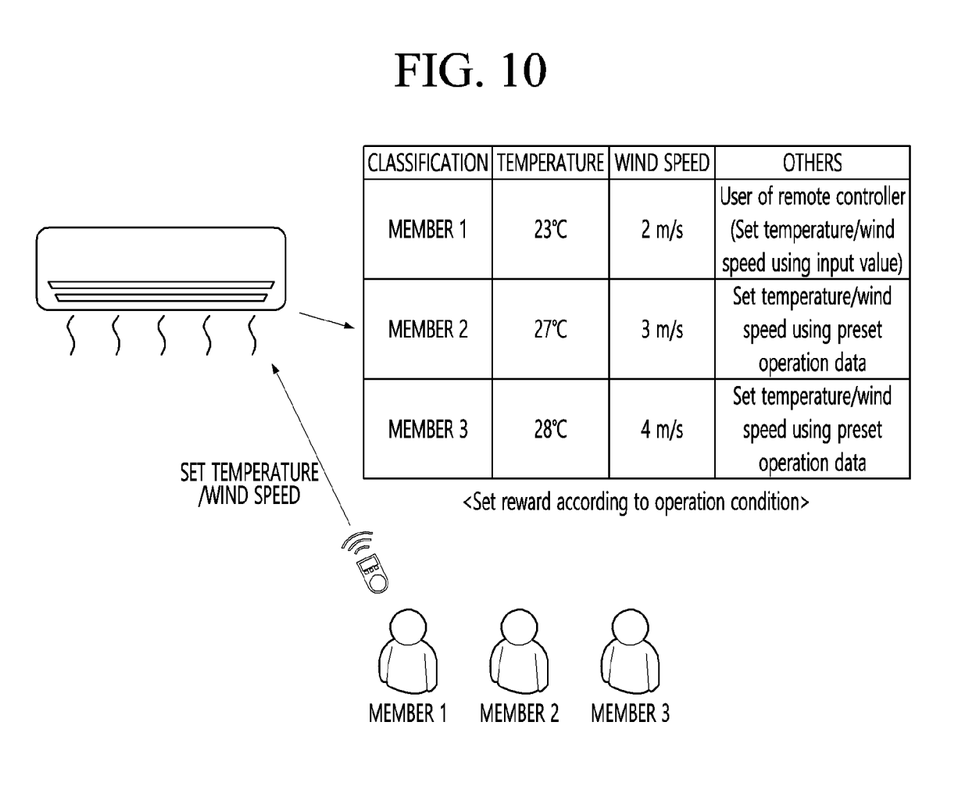
FIG. 10 is a view illustrating a process of setting reward with respect to the operation conditions of FIG. 9.

FIG. 10 is a view illustrating a process of setting the reward with respect to the operation conditions of FIG. 9.

Referring to FIG. 10, the operation data may be obtained by analyzing an operation pattern of a user who operates a remote controller of the air-conditioner, and the operation data may be labeled by giving an operation type of the air-conditioner, which is desired by the user, and a reward of each of the operation values according to the operation type.

According to an embodiment, in the case of a member 1 that is a user of a remote controller, the operation data may be adjustable with respect to the member 1 as a value input through the remote controller, and in the case of members 2 and 3, since the operation data is not be input through the remote controller, the operation data may operate as operation data that is preset through the member information that has undergone the existing learning process. The operation conditions of the operation data and the respective reward values are as described in Table 1 above.

According to an embodiment, the father in the house wants cool and pleasant wind (23 degrees), but the mother may want to be maintained at a proper temperature (26 degrees) for fear that the 5-year-old child gets air-conditioning disease. In this case, the air-conditioner may be adjusted in strength so that the wind direction is directed toward the father to increase in comfort level, and the child and mother feel the temperature stay at a temperature of 26 degrees through the indirect wind direction.

The air-conditioner may have the convenience of automatically updating the operation conditions of each member without a user's setting operation by updating the reward through the image acquisition device or voice recognition.

Figure 11:
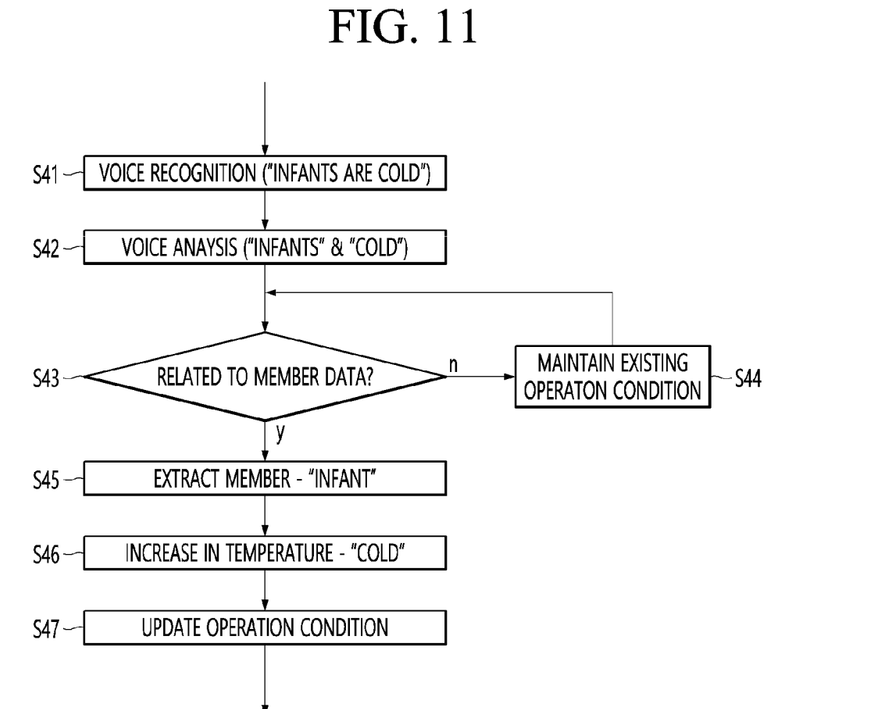
FIG. 11 is a view illustrating a process of updating operation conditions through voice recognition according to a second embodiment of the present invention.

FIG. 11 is a view illustrating a process of updating operation conditions through voice recognition according to a second embodiment of the present invention.

Referring to FIG. 11, operation conditions may be updated by recognizing a member's voice.

In the process of updating the operation conditions, the member may be extracted (S45) through a voice recognition process (S41), a voice analysis process (S42), and a process (S43) of determining whether the operation conditions relate to the member data, and the operation conditions may be updated through an extraction (S45) of the member and an increase (S46) in temperature.

A voice may be analyzed through voice recognition, and what operation conditions to be updated is determined by determining whether there are members involved. If it is not related to the member data, it is possible to be maintained in the existing operation conditions (S44).

The operation data or operation condition may include any method that is capable of being updated in real time according to the request of the member. For example, if the member 2 (the mother) says "children are cold" to the air-conditioner, the rewards for people with a height of less than 130 cm in the clustering result may be updated and reflected in the temperature control of the air-conditioner.

In this case, if necessary, the updates for the rewards may also be implemented through additional voice recognition. For example, in the process of updating the operation conditions, a process of checking whether a specific reward is input may be added, and thus, a process of resetting the reward according to each operation condition may be included.

Figure 12:
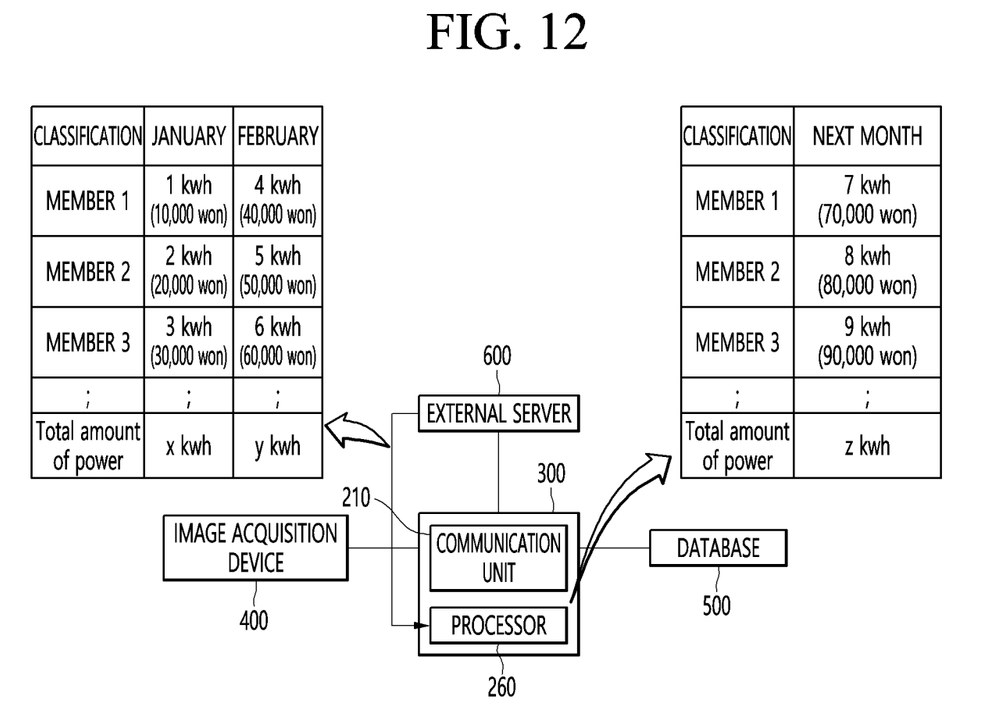
FIG. 12 is a view illustrating a process of deducing prediction information on power consumption in the future based on an electricity bill according to existing power consumption and electricity usage including the electricity bill.

FIG. 12 is a view illustrating a process of deducing prediction information on power consumption in the future based on an electricity bill according to existing power consumption and electricity usage including the electricity bill.

Referring to FIG. 12, the air-conditioner 300 may be connected to an external server 600 that stores consumed power, and the external server 600 may calculate an amount of power consumed during a preset period for each member or household stored in the database 500 as an electricity bill to transmit the calculated power consumption to the processor 260 in real time.

According to an embodiment, the power consumption and the electricity bill for the next month may be estimated through the processor 260 based on the power consumption and electricity rate for January and February. The processor 260 may deduce predictive information on future electricity usage based on the electricity bill.

According to the embodiment of the present invention, the air-conditioner has the advantage of reducing the power consumption by learning the members by itself and controlling the activity in the optimal state.

The above-disclosed subject matter is to be considered illustrative, and not restrictive, and the appended claims are intended to cover all such modifications, enhancements, and other embodiments, which fall within the true spirit and scope of the present invention.

Thus, the embodiment of the present invention is to be considered illustrative, and not restrictive, and the technical spirit of the present invention is not limited to the foregoing embodiment.

Therefore, the scope of the present invention is defined not by the detailed description of the invention but by the appended claims, and all differences within the scope will be construed as being included in the present invention.

The invention claimed is:

1. An artificial intelligence (AI)-based air conditioner comprising:
   a processor configured to:
      acquire a signal including an image on members;
      acquire operation data including operation conditions of the air conditioner, which are desired by the members, from the signal;
      store member data on members included in the signal and the operation data which is matched with the member data in a database; and
      analyze the operation conditions of the air conditioner, which are desired by the members, with respect to each member based on the member data and the operation data stored in the database,
   wherein, when the analyzed operation conditions of the air conditioner for each member conflict with each other, the processor is further configured to:
      drive a first desired temperature and a wind direction of the air conditioner for a first member according to the analyzed operation conditions, and
      drive a wind speed to stay at a second desired temperature of the air conditioner for a second member despite the analyzed operation conditions.

2. The AI-based air conditioner according to claim 1, further comprising:
   a memory configured to store a member data recognition model that is trained using a machine learning or deep learning algorithm, the member data recognition model being configured to recognize the members from the signal.

3. The AI-based air conditioner according to claim 2, wherein the processor is configured further configured to:
   input the image acquired from an image acquisition device as input data to the member data recognition model;
   acquire the member data recognized from the member data recognition model; and
   identify the members using the air conditioner based on the image and the member data.

4. The AI-based air conditioner according to claim 3, wherein the member data includes information on at least one of a face shape, a body shape, or voice, through which the members are distinguished from each other.

5. The AI-based air conditioner according to claim 4, wherein the face shape or the body shape is extracted from a still image or a moving image included in the signal, which is collected at one or more different angles according to movement of each of the members.

6. The AI-based air conditioner according to claim 1, wherein the member data includes biometric information having at least one of pulse information, body temperature information, or facial expression information of each member.

7. The AI-based air conditioner according to claim 1, wherein the member data includes environment information around each member, and
   for each member, the environment information includes at least one of location information of the member, time information, or room temperature information.

8. The AI-based air conditioner according to claim 1, wherein the operation data are obtained by analyzing an operation pattern of a member operates a remote controller of the air conditioner.

9. The AI-based air conditioner according to claim 8, wherein the operation data is labeled by giving an operation type of the air conditioner desired by the user and a reward for each of operation values according to the operation type.

10. The AI-based air conditioner according to claim 8, wherein the operation data is configured to be updated in real time according to each members request.

11. The AI-based air conditioner according to claim 9, wherein the processor is configured to acquire the operation data by recognizing the members' voices and update words of the voices, and updates the reward if the voices correspond to the operation type.

12. The AI-based air conditioner according to claim 1, wherein the air conditioner is connected to an external server configured to store power consumed by the air conditioner, and wherein the external server is configured to calculate one or more values associated with an amount of electricity, which is consumed for a preset period for each member or household stored in the database, for an electricity bill, and to transmit the calculated one or more values to the processor in real time.

13. The AI-based air conditioner according to claim 12, wherein the processor is configured to deduce predictive information on future electricity usage based on the electricity bill.

* * * * *